(12) United States Patent
Hole

(10) Patent No.: US 8,693,445 B2
(45) Date of Patent: Apr. 8, 2014

(54) REDUCED TRANSMISSION TIME INTERVAL

(75) Inventor: David Philip Hole, Southampton (GB)

(73) Assignee: Nokia Siemens Networks Oy, Espoo (FI)

( * ) Notice: Subject to any disclaimer, the term of this patent is extended or adjusted under 35 U.S.C. 154(b) by 510 days.

(21) Appl. No.: 12/672,388

(22) PCT Filed: Jul. 17, 2008

(86) PCT No.: PCT/EP2008/059377
§ 371 (c)(1),
(2), (4) Date: Dec. 23, 2010

(87) PCT Pub. No.: WO2009/019116
PCT Pub. Date: Feb. 12, 2009

(65) Prior Publication Data
US 2011/0090876 A1    Apr. 21, 2011

(30) Foreign Application Priority Data

Aug. 7, 2007  (GB) .................................. 0715281.2

(51) Int. Cl.
*H04W 4/00* (2009.01)
*H04J 3/00* (2006.01)

(52) U.S. Cl.
USPC ........................ 370/336; 370/329; 370/341

(58) Field of Classification Search
USPC ........................................ 370/329, 336, 341
See application file for complete search history.

(56) References Cited

U.S. PATENT DOCUMENTS

2004/0258038 A1 * 12/2004 Beard et al. ................... 370/348

FOREIGN PATENT DOCUMENTS

| WO | 2004/114564 A1 | 12/2004 |
| WO | 2005/114919 A1 | 12/2005 |
| WO | 2007/022126 A2 | 2/2007 |

OTHER PUBLICATIONS

3GPP TSG-GERAN Meeting#34; GP 070704; Shenzhen, China, May 14-18, 2007.*
Bibliographic information for European Patent Application 1757027 A1, dated Feb. 28, 2007, which corresponds to WO 2005/114919.
Bibliographic information for Russian Patent Application 2289210, dated Dec. 10, 2006, which corresponds to WO 2004/114564.
International Search Report and Written Opinion of the International Searching Authority mailed Dec. 10, 2008 in corresponding International Application No. PCT/EP2008/059377.
Notice of Allowance issued Sep. 19, 2012 in corresponding Russian Application No. 2010108236/07(011602).
"Digital cellular telecommunications system (Phase 2+); General Packet Radio Service (GPRS); Mobile Station (MS)—Base Station System (BSS) Interface; Radio Link Control / Medium Access Control (RLC/MAC) protocol" (3GPP TS 144 060 V7.9.0 Release 7; Jun. 2007, pp. 1-502.

(Continued)

*Primary Examiner* — Noel Beharry
*Assistant Examiner* — Kodzovi Acolatse
(74) *Attorney, Agent, or Firm* — Staas & Halsey LLP

(57) ABSTRACT

A method is suggested for communicating to a mobile station which timeslots are configured as packet data channel pairs and on which of these packet data channel pairs the mobile station is assigned resources, wherein a description of packet data channel pairs is separated into "configuration" and an "assignment".

16 Claims, 6 Drawing Sheets

(56) References Cited

OTHER PUBLICATIONS

"Digital cellular telecommunications system (Phase 2+); General Packet Radio Service (GPRS); Overall description of the GPRS radio interface; Stage 2" (3GPP TS 143 064 V7.5.0 Release 7); May 2007, pp. 1-74.

"Working Assumptions for RTTI blocks", 3GPP TSG-GERAN #34; GP-070984; May 2007, pp. 1-3.

* cited by examiner

REDUCED TRANSMISSION TIME INTERVAL

CROSS REFERENCE TO RELATED APPLICATIONS

This application is a U.S. National Stage of International Application No. PCT/EP2008/059377 filed on Jul. 17, 2008 and claims the benefit thereof. The International Application claims the benefit of GB Application No. 0715281.2 filed on Aug. 7, 2007, both applications are incorporated by reference herein in their entirety.

BACKGROUND OF THE INVENTION

Described below is a method of reducing the transmission time interval (TTI) in enhanced general packet radio service (GPRS) EGPRS networks.

Currently, radio blocks are divided into four bursts; up to and including in 3GPP GERAN Release 6 the bursts are transmitted on a specific timeslot in four time division multiple access (TDMA) frames. Each TDMA frame is approximately 5 ms in duration, making the transmission time interval approximately 20 ms.

According to the reduced transmission time interval (TTI) RTTI scheme introduced in Release 7 of the 3rd Generation Partnership Project (3GPP) General Packet Radio Service (GPRS)/Enhanced Data for global system for mobile communication (GSM) Evolution (EDGE) Radio Access Network (GERAN) 3GPP GERAN standards, timeslots (of which there are eight, numbered 0 through 7, per TDMA frame) can be combined into pairs; then four bursts are transmitted using two (paired) timeslots in each of two TDMA frames, reducing the TTI to approximately 10 ms. The configuration of a pair of timeslots (which may or may not be on the same carrier) is referred to as a packet data channel (PDCH)-pair.

In the case of downlink dual carrier assignments a mobile can receive on two different carriers simultaneously. This addresses both the case where PDCH-pairs must use timeslots on the same carrier and the case where no such restriction exists (where so-called 'split PDCH-pairs' are possible). In the latter case, this concerns only the case where, if PDCH-pairs are on different carriers, the timeslot numbers are the same.

In general, this considers that PDCH pairs cannot 'split' another pair e.g. a pair on 1,3 cannot co-exist with a pair on 2,4.

It is assumed that in any RTTI configuration, there must be at least one uplink (UL) PDCH pair and one downlink (DL) PDCH pair (even though it is not essential that the mobile has resources assigned on both, they are needed for packet associated control channel (PACCH)).

Due to the medium access control (MAC) protocols used in GERAN, it is not required that every UL PDCH pair must have a corresponding DL PDCH pair (in such a case, either extended dynamic allocation (EDA) can be used, or a modified shifted uplink status flag (USF) approach can be used see 3GPP TS 44.060 v.7.0.0).

Similarly, it is not required that every DL PDCH pair must have a corresponding UL PDCH pair: the network is forbidden from polling a mobile on a DL PDCH pair for which no corresponding UL PDCH pair exists.

The problem here is to communicate efficiently to the mobile which timeslots are configured as PDCH-pairs and on which of these PDCH-pairs the mobile is assigned resources.

A subset of this problem is to efficiently encode the description of how PDCH-pairs are assigned to different timeslots and, in the case of Downlink Dual Carrier, different carriers.

It is further necessary to specify how a mobile determines, based on the configuration and/or its assignment, which uplink (UL) and downlink (DL) PDCH-pairs correspond to each other. These so-called 'corresponding pairs' govern, for example, on which DL PDCH-pair the mobile should expect to receive an uplink state flag (USF) indicating that it may transmit on a given UL PDCH-pair; also, on which UL PDCH-pair should a mobile respond to a poll sent on a given downlink PDCH-pair.

Description of PDCH-pairs is separated into a "configuration" and an "assignment". A mobile may receive a message which describes a change in configuration or assignment or both.

Broadly speaking, the configuration describes all RTTI PDCH-pairs currently in use on a given carrier (or pair of carriers), and is distinct from timeslots which are used for non-RTTI packet transfer, or for circuit-switched voice or data transfer. The assignment describes the subset of PDCH-pairs on which a given mobile can expect to transmit or receive data, and also specifies various RLC and MAC parameters (uplink state flag, etc.).

Two methods of encoding the configuration are specified using a bitmap, either fixed or variable length, depending on whether or not 'split PDCH-pairs' are permitted.

Rules for determining which PDCH-pairs are 'corresponding PDCH-pairs' are specified, based on either the configuration or the assignment.

Rules for informing the mobile of a change in assignment or a change in configuration, or both are specified, including the definition of a new message to inform mobiles (possibly a broadcast message) that a configuration has changed, but the assignment remains (broadly) as before, based on the new configuration.

A mobile may be sent a message describing a modification to an existing assignment, without a corresponding change in configuration, e.g. a downlink assignment message may indicate that the mobile now is assigned resources on downlink PDCH-pairs 1 & 2, instead of on 2 & 3.

A mobile may be sent a message describing a modification to an existing configuration, without a corresponding change in assignment, e.g., downlink PDCH-pair 3 now uses timeslots 5 & 6, rather than on 5 & 7. Any resources assigned on DL PDCH-pair 3 remain unchanged (but using the new timeslots).

Since the configuration affects all mobiles using resources on a specific carrier, a message indicating a change of configuration is defined which is a broadcast message. That message may be sent repeatedly to ensure reception and may include a 'start time' at which the new configuration will apply.

The mobile should be informed of the configuration currently being used. The configuration need not be described in subsequent assignment messages if it has not changed.

PDCH-pairs within a configuration are identified by a number, and the identifying number is increased in order of the timeslot numbers used in the configuration. E.g., PDCH-pair using timeslots 1 & 2 is PDCH-pair number 1, PDCH-pair on timeslots 3 & 5 is PDCH-pair number 2. In order to re-use existing message structures, these identifying numbers are considered equivalent to timeslot numbers in legacy configurations—legacy messages/structures etc. referring to timeslot numbers can be used without change, to refer to PDCH-pairs.

A default configuration is specified, having 4 PDCH-pairs per carrier, with PDCH pair i (0≤i≤3) using timeslots 2i and 2i+1, both in the UL and DL.

The described PDCH-pair configuration need not match the actual PDCH-pair configuration, provided that assignments refer only to PDCH-pairs which actually exist. This means that, for example, the default configuration may be indicated even if only a subset of PDCH-pairs in the described configuration exist. This has the benefit of reducing the amount of signaling information both for the default configuration and where the actual configuration changes but, thanks to this rule, no actual notification is required to mobiles.

BRIEF DESCRIPTION OF THE DRAWINGS

These and other objects and advantages of the present invention will become more apparent and more readily appreciated from the following description of the preferred embodiments, taken in conjunction with the accompanying drawings of which:

Figure 1:
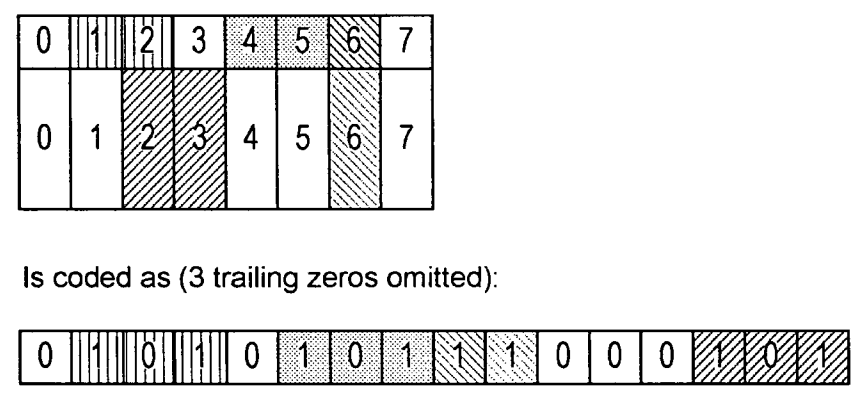

FIG. 1 is a graphic depiction of a first coding example;

FIG. 2 is a graphic depiction of a second coding example;

FIG. 3 is a graphic depiction of a third coding example;

FIG. 6 is a graphic depiction of a coding example regarding ALTERNATIVE 2.

DETAILED DESCRIPTION OF THE PREFERRED EMBODIMENT

Figure 4:
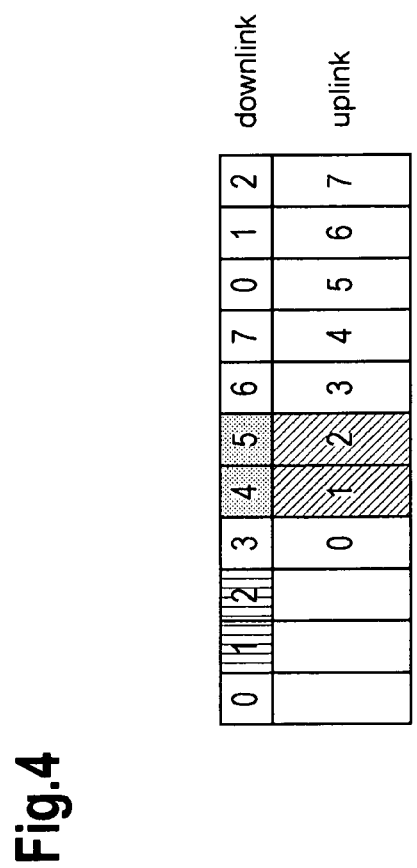
FIG. 4 is a graphic depiction of a coding example regarding ALTERNATIVE 1.

Reference will now be made in detail to the preferred embodiments of the present invention, examples of which are illustrated in the accompanying drawings, wherein like reference numerals refer to like elements throughout.

Coding of the Configuration Description when Split PDCH-Pairs is not Permitted

If split PDCH-pairs are not permitted, then up to four PDCH pairs may be configured on a carrier. These are described in a 7- or 8-bit bitmap as follows. PDCH pair 1 is configured on the two lowest-numbered timeslots whose corresponding bits in the bitmap are set to 1. PDCH pair 2 is configured on the two timeslots with the next lowest timeslot numbers whose corresponding bits in the bitmap are set to 1 and so on. The bit corresponding to timeslot 7 need not be included in the assignment message but can be considered a 1 if there are an odd number of 1's in the included bitmap, otherwise it shall be considered a 0 (since there must be an even number of 1's in the total bitmap).

For mobiles currently in packet transfer mode or Dual Transfer Mode (i.e. currently having some packet resources), the absence of the UL PDCH Pairs bitmap and DL PDCH pairs bitmap shall indicate that the PDCH pair configuration has not changed since the previous assignment message was received.

For mobiles currently in packet idle mode or dedicated mode (i.e. having no packet resources), the absence of the UL PDCH Pairs bitmap and DL PDCH pairs bitmap shall indicate that the PDCH pair configuration are according to a default configuration, as follows: on both uplink and downlink, PDCH pair i (0≤i≤3) is on timeslots 2i and 2i+1.

An explicit indication of the use of the default configuration shall also be specified.

For existing assignment messages, structures and information elements (IEs) which allocate resources in RTTI mode, and other messages, e.g., measurement report messages, references to Timeslot Numbers shall refer to PDCH Pairs. A message which refers to resources on a PDCH pair that is not known (e.g., for all PDCH pairs 4, 5, 6, 7 which cannot exist for a non-downlink dual carrier configuration) shall be considered to be an error.

Coding of the Configuration Description when Split PDCH-Pairs is Permitted

If split PDCH-pairs are permitted then, according to the approach provided herein, a variable-length bitmap is used to code the PDCH-pairs, according to the following algorithm:

For each timeslot/carrier, starting at TN0 on C1 going through (TN7, C1), then (TN0, C2)→(TN7, C2):

if this timeslot forms part of a PDCH pair *and* forms part of a split PDCH (i.e. the other timeslot is on a different carrier) *and* the other timeslot in the pair has already been referenced in the bitmap, then skip this timeslot, otherwise:

if this timeslot does not form part of a PDCH pair→insert 0 in bitmap if this timeslot forms part of a PDCH pair→insert 1 in bitmap if the other timeslot which forms part of this PDCH pair has already been denoted in the bitmap proceed to the next timeslot, otherwise if the other timeslot which forms part of this PDCH pair has not already been denoted in the bitmap:

if the other timeslot in this PDCH pair is on the same carrier→insert 0 in bitmap if the other timeslot in this PDCH pair is on a different carrier but on the same timeslot (i.e. a 'split PDCH pair')→insert 0 in bitmap As an option, any trailing zeros can be omitted, if the bitmap is preceded by an indication of its length.

As a further option, in addition to trailing zeros, the last '1' can be omitted (if the bitmap is always terminated by a 1, then this can be implicit).

As a further option, a one or two default codes are assigned to indicate that every timeslot forms part of a PDCH, where the first default code indicates that all PDCH-pairs use timeslots on the same carrier and on contiguous timeslots and there are four PDCH-pairs per carrier; the second default code indicates that all PDCH-pairs are split PDCH-pairs, and there are 8 PDCH-pairs per two carriers.

Coding Examples:

With PDCH pairs on (see FIG. 1)

[(C1,TN1), (C1,TN2)]
[(C1,TN4), (C1,TN5)]
[(C1,TN6), (C2,TN6)]
[(C2,TN2), (C2,TN3)]

is coded as:

0 1 0 1 0 1 0 1 1 1 0 0 0 1 0 1 (3 trailing zeros omitted)

Figure 2:
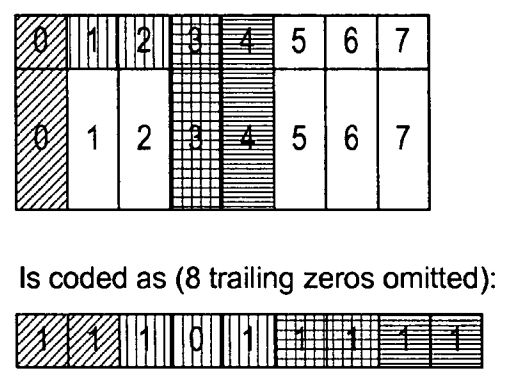

PDCH pairs on (see FIG. 2)

[(C1,TN0), (C2,TN0)]
[(C1,TN1), (C1,TN2)]
[(C1,TN3), (C2,TN3)]
[(C1,TN4), (C2,TN4)]

is coded as:

1 1 1 0 1 1 1 1 1 (8 trailing zeros omitted)

Figure 3:
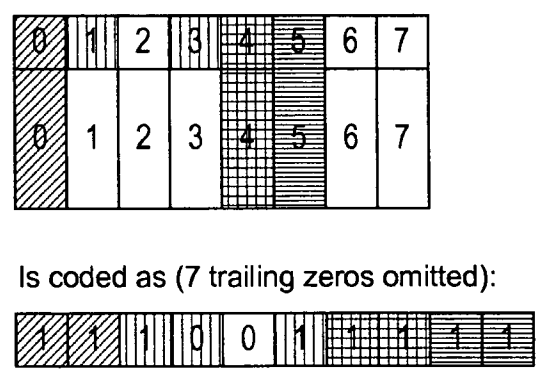

With PDCH pairs as (see FIG. 3)

[(C1,TN0), (C2,TN0)]
[(C1,TN1), (C1,TN3)]
[(C1,TN4), (C2,TN4)]
[(C1,TN5), (C2,TN5)]

is coded as:
1 1 1 0 0 1 1 1 1 1 (7 trailing zeros omitted)
Example coding of default options (using CSN.1 coding):

| { 00 -- | no PDCH pairs configured (or configuration as per previously received description) |
|---|---|
| \| 01 -- | default option 1 |
| \| 10 -- | default option 2 |
| \| 11 < PDCH Description length : bit (5) > < PDCH Description : bit (val(PDCH Description length)) > } | |

This scheme is beneficial, because it efficiently encodes the arrangement of PDCH pairs in a logical manner. It is logical, insofar as timeslots are processed in order (unless already specified); it is efficient in that it makes use of the redundancy by not encoding timeslots that are known to be part of a PDCH pair when it is a 'split pair' and this has already been specified for the other timeslot (which must be on the same timeslot number).

Determining Corresponding PDCH-Pairs: ALTERNATIVE 1:

(1) Default PDCH-pair correspondence is according to the set of PDCH-pairs used in the assignment: The i-th PDCH-pair in the DL assignment corresponds to the i-th PDCH-pair in the UL assignment (for mTBF, these refer to the union of all PDCH-pairs in assignments for all TBFs).

(2) If there are n DL PDCH-pairs and m UL PDCH-pairs in the assignment, and m>0, n>0, m≠n:

a. if n>m, the jth DL PDCH-pair (j>m) corresponds to the m th UL PDCH-pair.

If there are PDCH pairs on (see FIG. 4)
   Downlink [(C1,TN1), (C1,TN2)]
   Downlink [(C1,TN4), (C1,TN5)]
   Uplink [(C2,TN1), (C2,TN2)]

The UL PDCH-pair corresponds to both downlink PDCH-pairs, i.e. a poll on either downlink PDCH-pair is responded to on the single UL PDCH-pair. However, only the USF on the first downlink PDCH-pair signals an UL allocation.

An alternative is that there is no corresponding UL PDCH-pair; network is never allowed to poll on this PDCH-pair.

b. if m>n, the j-th UL PDCH-pair (j>n) corresponds to the m-th DL PDCH-pair.

Figure 5:
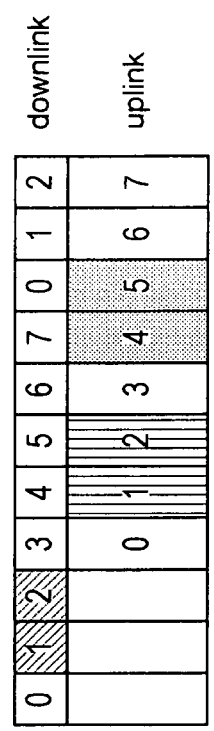
FIG. 5 is a graphic depiction of a further coding example regarding ALTERNATIVE 1.

An example is shown in FIG. 5:
   Downlink [(C1,TN1), (C1,TN2)]
   Uplink [(C2,TN1), (C2,TN2)]
   Uplink [(C2,TN4), (C2,TN5)]

In the example above, there are two options:
i) use Extended Dynamic Allocation (EDA) to signal allocations on the two UL PDCH-pairs;
ii) use a modified 'shifted USF' approach i.e. define two separate USFs to be sent on the DL PDCH-pair which correspond to each of the two UL PDCH-pairs.

(3) UPLINK_CONTROL_TIMESLOT can be re-used to mean UPLINK_CONTROL_PDCH_PAIR.

(4) If n=0 (i.e. no DL PDCH-pairs in the assignment), then the corresponding PDCH-pair is found according to Alternative 2, see below.

Determining Corresponding PDCH-Pairs: ALTERNATIVE 2:

(1) Default PDCH-pairs correspondence is according to the timeslots used in the PDCH pair configuration. For an UL PDCH pair using timeslots i and j (i<j), the corresponding downlink pair is a. the one which uses DL timeslot i and some other timeslot k, k>i, or, if that does not exist,
b. the one which uses DL timeslot i−1 and some other timeslot k, k≥i; or, if that does not exist,
c. keep searching by increasing x (starting at 1) for a PDCH pair which uses DL timeslot i−x and some other timeslot k, k>i−x.

Figure 6:
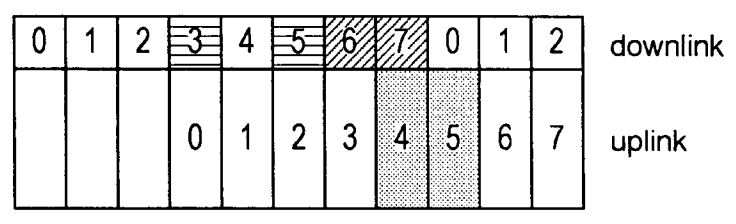

An example is shown in FIG. 6:
   Downlink [(C1,TN3), (C1,TN5)]
   Downlink [(C1,TN6), (C1,TN7)]
   Uplink [(C2,TN4), (C2,TN5)]

In the above example, the DL PDCH-pair on 3, 5 corresponds to UL PDCH pair on 4, 5.

Note that the above search may find nothing (you get to the beginning of the frame); in this case, search forward until you find a PDCH-pair in the DL; in the above example, if the PDCH-pair on 3,5 did not exist, then the PDCH-pair on 6,7 would be the corresponding pair.

Changing Assignments/Configurations

It is likely that over time, a mobile's assignment will change, also that the cell RTTI configuration will change. These can change independently of each other or jointly.

Considering four possible cases:

a. The configuration changes, the assignment doesn't change [the timeslots used for the PDCH-pairs which make up the assignment do not change]. In this case, the PDCH-pair numbers may change; this will have no impact except for measurement reports. The mobile report will have to use the new PDCH-pair numbers, rather than the old numbers. In this case, a new message is required to notify the mobile of the new configuration.

b. The configuration changes, and as a direct result, the assignment changes [the timeslots used for the PDCH-pairs which make up the assignment do change]. A new assignment message is not needed if:
   i) resources (inc. USFs) on PDCH-pair i remain on PDCH-pair i; and,
   ii) resources on PDCH-pairs (including, in the case of DL PDCH-pairs, their USFs) which no longer exist in the new configuration are implicitly released;
   iii) all remaining corresponding pairs (i.e. not those involving pairs released under rule 2 above) remain the same (i.e. DL PDCH-pair i and UL PDCH-pair j were corresponding pairs before and after the re-configuration).
   In this case, a new message is required to notify the mobile of the new configuration.

c. The assignment and the configuration change. In this case, a new assignment message, including a description of the new configuration is required.

d. The assignment changes, but the configuration does not change. In this case a new assignment message is required; the configuration description may be omitted.

Further advantages include that
by specifying a way of calculating the corresponding pairs based on the configuration and/or assignment information, no additional signaling is required between the network and the mobile;
by defining a new message to indicate that the configuration has changed, but the assignment has not (except for some implicit indications) no new assignment message is needed, thereby reducing signaling;
by specifying that the configuration information should be sent to mobiles in addition to the assignment information, the new message may be broadcast to multiple devices where the assignment information has not changed, further reducing signaling; and by specifying a default configuration reduces the average amount of signaling for RTTI messages, since this default configuration would use a very short code but would be applicable in many scenarios.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for communicating to a mobile station which timeslots are configured as packet data channel pairs with up to four packet data channel pairs configured on a carrier, and on which of the packet data channel pairs the mobile station is assigned resources, comprising:

separating, by a network device having a processor and a memory, a description of packet data channel pairs into a configuration and an assignment, in which the configuration describes all reduced transmission time interval packet data channel pairs currently in use on one of a given carrier and a pair of carriers, excluding any timeslots used for non-reduced transmission time interval packet transfer and any timeslots used for circuit-switched voice or data transfer, and the assignment describes a subset of packet data channel pairs on which the mobile station can expect to transmit or receive data; and describing up to four packet data channel pairs in a 7-bit bitmap or an 8-bit bitmap, with packet data channel pair 1 configured on the two lowest-numbered timeslots whose corresponding bits in the bitmap are set to 1 and packet data channel pair 2 configured on the two timeslots with the next lowest timeslot numbers whose corresponding bits in the bitmap are set to 1.

2. The method of claim 1, further comprising assigning a set of resources to the mobile station by the configuration of packet data channel pairs together with the assignment indicating on which packet data channel pairs resources are assigned together with assignment parameters.

3. The method according to claim 1, further comprising encoding a description of how packet data channel pairs are assigned to different timeslots and, in the case of a downlink dual carrier, different carriers.

4. The method according to claim 1, further comprising determining by the mobile station, based on at least one of the configuration and the assignment, which uplink and downlink packet data channel pairs correspond to each other.

5. The method according to claim 4, wherein the uplink and the downlink packet data channel pairs govern on which downlink packet data channel pair the mobile station should expect to receive an uplink state flag indicating that it may transmit on a given uplink packet data channel pair.

6. The method according to claim 4, wherein the uplink and the downlink packet data channel pairs govern on which uplink packet data channel pair should the mobile station respond to a poll sent on a given downlink packet data channel pair.

7. The method according to claim 1, further comprising receiving by the mobile station a message which describes a change in at least one of configuration and assignment.

8. The method according to claim 1, further comprising specifying two methods of encoding the configuration using a bitmap, either fixed or variable length, depending on whether split packet data channel pairs are permitted.

9. The method according to claim 1, further comprising specifying rules for determining which packet data channel pairs are corresponding packet data channel pairs, based on either the configuration or the assignment.

10. The method according to claim 1, further comprising specifying rules for informing the mobile station of at least one of a change in assignment and of a change in configuration.

11. The method according to claim 1, further comprising specifying a default configuration of four packet data channel pairs per carrier, with packet data channel pair i ($0 \leq i \leq 3$) using timeslots $2i$ and $2i+1$, both in the uplink and downlink.

12. The method according to claim 1, wherein the packet data channel pair configuration described need not match an actual packet data channel pair configuration, provided that assignments refer only to packet data channel pairs which actually exist.

13. The method according to claim 1, further comprising specifying an explicit indication of the use of the default configuration.

14. The method according to claim 1, further comprising setting packet data channel pairs correspondence according to the timeslots used in the packet data channel pair configuration.

15. The method according to claim 14, wherein said setting the packet data channel pairs correspondence comprises selecting for an uplink packet data channel pair using timeslots i and j ($i<j$), the corresponding downlink pair as one which uses downlink timeslot i and some other timeslot k, $k>i$, or, if that does not exist, one which uses downlink timeslot $i-1$ and some other timeslot k, $k \geq i$; or, if that does not exist, searching by increasing x (starting at 1) for a packet data channel pair which uses downlink timeslot $i-x$ and some other timeslot k, $k>i-x$.

16. A mobile station, comprising:

a receiver configured to receive a communication as to which timeslots are configured as packet data channel pairs with up to four packet data channel pairs configured on a carrier, and on which of the packet data channel pairs the mobile station is assigned resources, the communication including a description of packet data channel pairs separated into a configuration and an assignment, in which the configuration describes all reduced transmission time interval packet data channel pairs currently in use on one of a given carrier and a pair of carriers, excluding any timeslots used for non-reduced transmission time interval packet transfer and any timeslots used for circuit-switched voice or data transfer, and the assignment describes a subset of packet data channel pairs on which the mobile station can expect to transmit or receive data, and describing up to four packet data channel pairs in a 7-bit bitmap or an 8-bit bitmap, with packet data channel pair 1 configured on the two lowest-numbered timeslots whose corresponding bits in the bitmap are set to 1 and packet data channel pair 2 configured on the two timeslots with the next lowest timeslot numbers whose corresponding bits in the bitmap are set to 1.

* * * * *